United States Patent Office 3,422,469
Patented Jan. 21, 1969

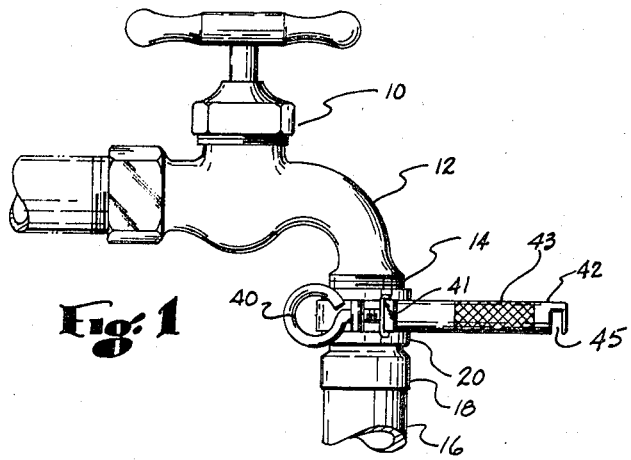
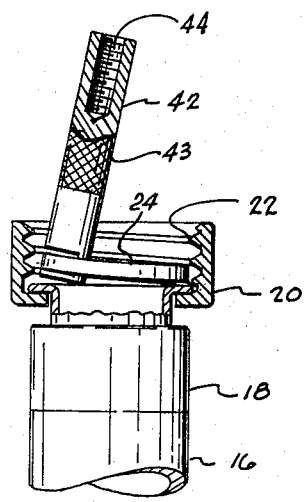
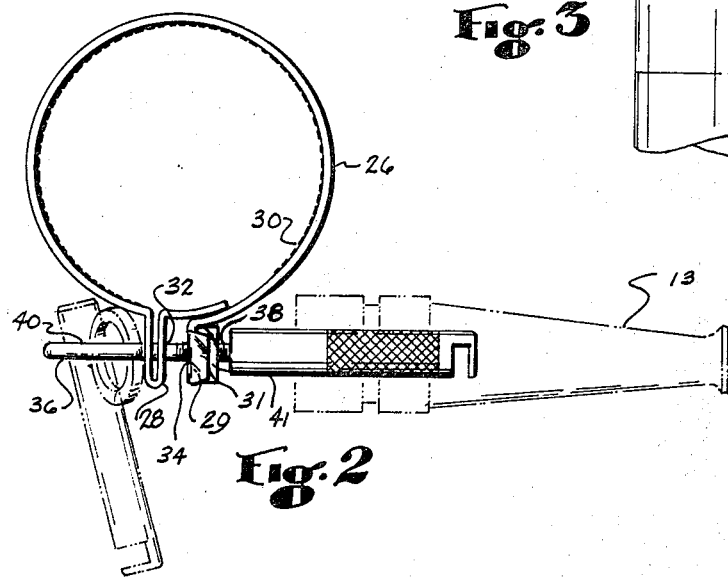

1

3,422,469
HOSE COUPLING TOOL
Wilfred Tunstall, 12874 2nd St., Yucaipa, Calif. 92399,
and Albert Wegner, 223 Syllmr Court, Calimesa, Calif.
92320
Filed Feb. 7, 1966, Ser. No. 525,679
U.S. Cl. 7—1      1 Claim
Int. Cl. B25f *1/00;* B67b *7/00*

This invention relates generally to a hose coupling tool and particularly to a device for tightening and releasing a hose coupling on a faucet. The tool has a further advantage of being able to easily remove and reseat the coupling washer.

One of the main objects of the invention is in the provision of a tool for quickly securing a hose coupling to a faucet to prevent leakage and for easy release.

Another object of the invention is to provide a hose coupling tightening and releasing tool that is operable without defacement or distortion of the hose coupling.

The results of manually coupling the flexible garden hose to a faucet are well known. The connection may be made to prevent leakage but in a large percentage of times it is impossible to physically secure the conventional elements to prevent leakage. Toothed jaw type tools are usually resorted to for tightening and releasing but these rigorous operations deface and finally distort the coupling collar.

The fundamental theory of the present invention is to provide a handy inexpensive tool particularly adapted for specific use in the final tightening of the coupling to stop leakage and for quick release. Manual coupling of the hose to the faucet is relatively easy but usually some additional means is required in the final non-leaking securement and release.

Yet another object of the invention is to provide a tool in which a quickly attachable ring clamp is lever secured and operable on the hose coupling.

Still another object of the invention lies on the fashioning of the tool for use as a washer removing and reseating means.

A further object of the invention is to provide a storage means for an additional washer; and a still further object of the invention is to provide a releaseable lever that may be used as a coupling tightener as well as a nozzle support.

These and other objects and advantages of the present invention will become apparent to those skilled in the art upon consideration of the following detailed description of the preferred embodiment thereof, reference being made to the accompanying drawings, herewith, wherein:

FIGURE 1 is an elevational view with the tool attached in operative position;

FIGURE 2 is a plan view of the tool; and

FIGURE 3 is an elevational view partially cut away showing the tool in use as a washer remover.

Referring specifically to the drawings in which a preferred embodiment of the invention is shown a conventional faucet 10 of the bibb type or otherwise has a nozzle 12 with exterior thread 14. A conventional flexible hose 16 has the standard circular flange 18 attachment to which is rotatably and loosely secured a coupling or collar 20 having an interior thread 22. A washer is shown at 24 resting on the upper edge of the flange which forms its seat. All of the parts above described are universally known and their attachment is not manually difficult except that it requires tremendous physical effort to make a connection that will not leak.

Applicant provides an expansible ring clamp 26 having outwardly projecting ends 28 and 29. The ring clamp is serrated inwardly at 30 and the end 29 is bracketed at 31 on two sides to secure a clamping nut, later to be described, and shown in FIGURE 1. The ends 28 and 29 are apertured at 32 and 34, respectively, to receive a bolt 36 threaded at 38 and having a large eye bolt end 40. The type of clamp connecting bolt is only important in that the large eye or ring end forms an easily available tightening means as well as an aid in releasing the clamp. A nut 41 on the threaded end 38 of the bolt 36 is held securely in the brackets 31.

A lever 42 of small diameter serrated at 43 has an elongated interior thread 44 so that the lever acts as an elongated attachment for the bolt 36. It is primarily essential that the lever 42 be first separable for use as a ring clamp tightening member as shown in FIGURE 2. Secondly the lever is used to apply considerable leverage to tighten the hose coupling on the faucet so that it will not leak. The lever 42 is also used as a support for the nozzle 13. The lever 42 is slotted at 45 near its outer end so that it can also be used as a means of removing a washer as shown in FIGURE 3. It can also be used as a tamping device for securing a washer in the coupling.

The operation of the device is relatively simple and the ring clamp is expansible to surround the coupling. The bolt is then secured by the lever actuating the eye bolt against the secured nut 41 to completely surround and hold the coupling. Leverage is then applied by the bolt connected lever 42 to tighten or release the coupling. There is no possibility of defacement or distortion of the coupling and the manual operation is quick and without effort.

While we have described in considerable detail what we believe to be the preferred form of our invention, it will be understood by those skilled in the art that various changes may be made in the shape and arrangement of the several parts without departing from the broad scope of our invention as defined in the following claims.

We claim:

1. A hose and faucet coupling tool assembly including a clamping ring having apertured ends for a connecting bolt, one of said ends being formed as a nut clamp;

a threaded connecting eye bolt for said clamping ring extending through said apertured ends;

a nut on said bolt and contained in said clamp;

a separable elongated lever of small diameter having a longitudinally threaded recess capable of attachment to the threaded portion of said bolt so as to support a nozzle passed over itself, said lever having a smaller dimension than the dimension of the opening in said bolt eye so as to be capable of extending therethrough whereby leverage may be applied to tighten or release the hose coupling and faucet connection to prevent leakage; and a washer removing slot on the outer end of said lever.

References Cited

UNITED STATES PATENTS

| 532,557 | 1/1895 | Hoffman | 81—8.1 |
| 1,373,673 | 4/1921 | Ritter | 24—279 |
| 2,283,179 | 5/1942 | Buckingham | 24—279 |

FOREIGN PATENTS

| 37,839 | 9/1923 | Norway. |

BERNARD A. GELAK, *Primary Examiner.*

U.S. Cl. X.R.

24—279; 81—64, 3.43